E. A. YOUNG.
PROCESS FOR MAKING WELTS.
APPLICATION FILED JULY 21, 1919.
1,393,477.
Patented Oct. 11, 1921.
2 SHEETS—SHEET 1.
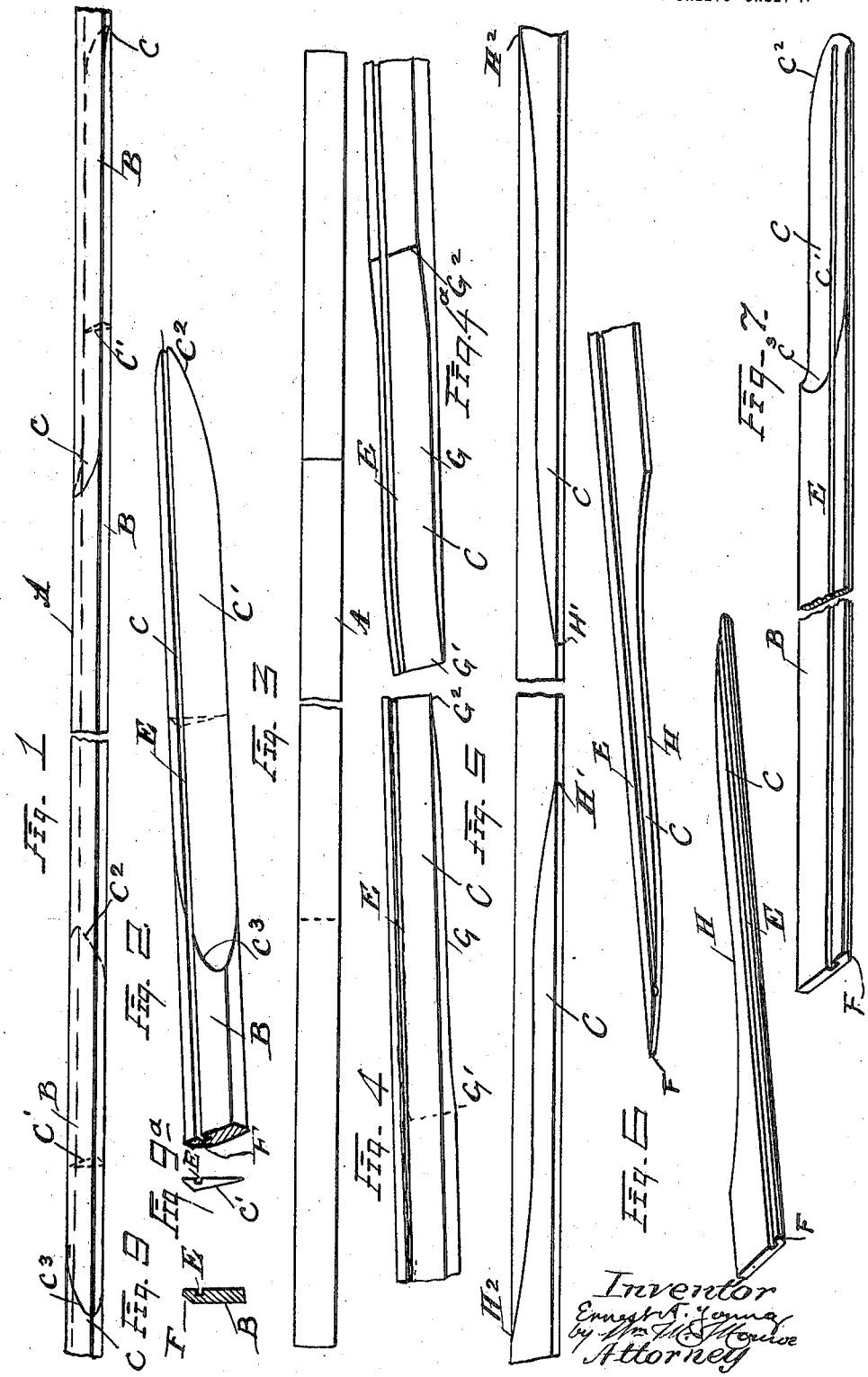

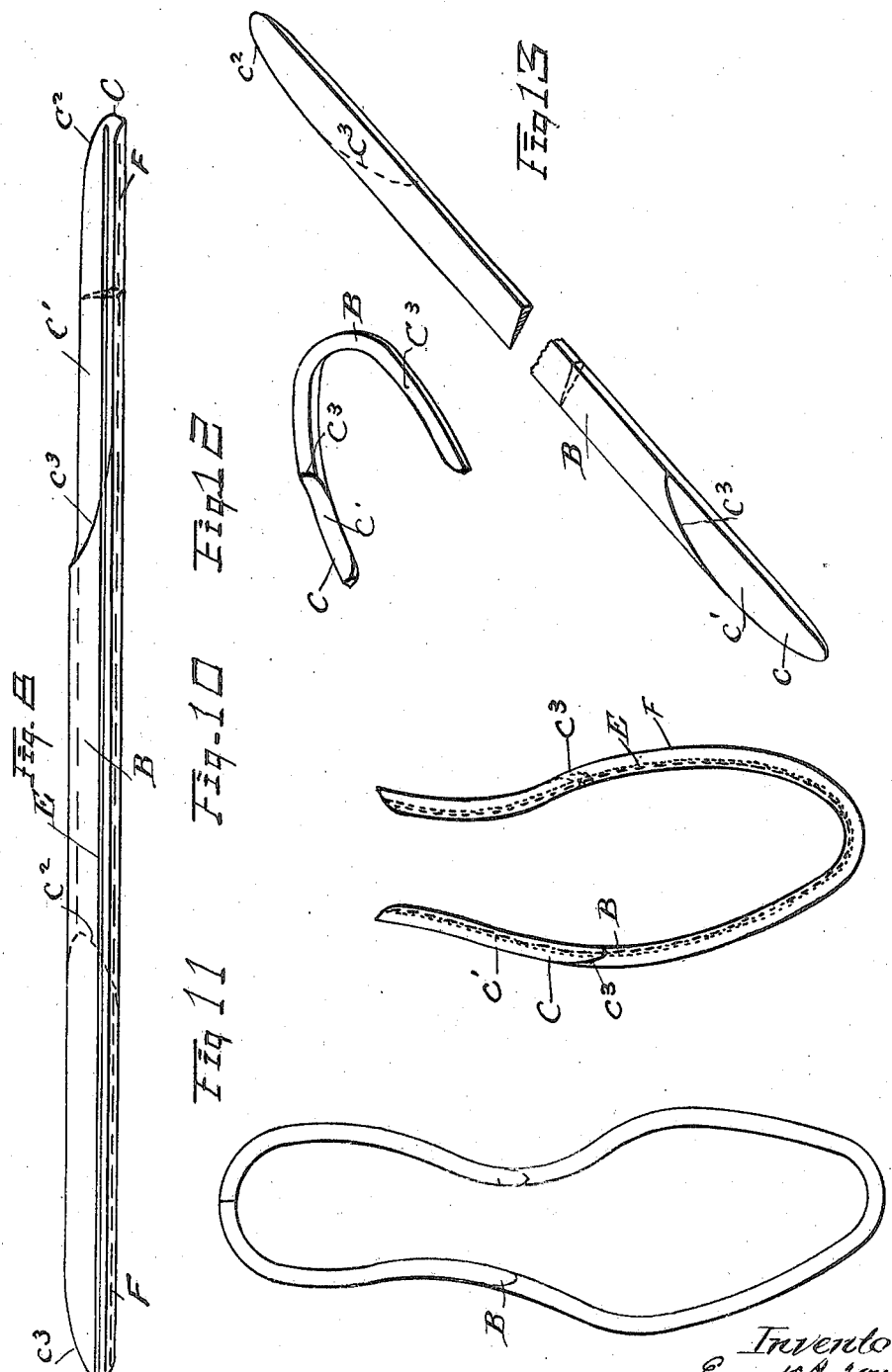

UNITED STATES PATENT OFFICE.

ERNEST A. YOUNG, OF CLEVELAND, OHIO.

PROCESS FOR MAKING WELTS.

1,393,477.  Specification of Letters Patent.  Patented Oct. 11, 1921.

Application filed July 21, 1919. Serial No. 312,166.

*To all whom it may concern:*

Be it known that I, ERNEST A. YOUNG, a citizen of the United States, and resident of Cleveland, in the county of Cuyahoga and State of Ohio, have invented certain new and useful Improvements in Processes for Making Welts, of which I hereby declare the following to be a full, clear, and exact description, such as will enable others skilled in the art to which it appertains to make and use the same.

The objects of the invention are to provide an improved method of conserving material in the manufacture of boots and shoes and which is applicable to use as a welt, sole rand, shank doubler, and heel rand, or combined shank doubler and heel rand, or for use, in any position between the sole and upper, and between the sole and heel, or in a stitched down shoe where the strip is placed above the upper.

This application includes the method of manufacture of welts and rands described in my former application Ser. No. 276,974 filed Feb. 14, 1919.

At the present time, welts are cut off by hand after being stitched to the shoe, producing remnants, and causing a waste of valuable material by the welt sewer, and then after being so cut leaving material that is cut off a second time; this second cutting being known as "butting the welt." By means of this improved process, individual welts are cut off, each, having the predetermined length required in the particular shoe in which it is to be fastened, and this waste is avoided.

The further object of this invention is the saving of four operations now done; the cutting off by the welt sewer, the "butting of the welt," which is the more accurate cutting off of the welt; the making of the thin outside edges of the welt, that are positioned adjacent to the shank portion of the shoe, and the thinning of the top sides and the outside edges of the welt at the point adjacent to the breast of the heel.

A further object of the invention is to produce a welt having feather outside edges at both extremities and these edges are applied to the shank portion of the shoe, in this manner making the edges very thin at the shank portions, and they practically disappear at their outside edges, which much improves the appearance of fine shoes.

Heretofore a large amount of scrapped material has been produced but in this method no scrap at all is produced.

The leading feature of the invention is to so cut a multiple number of individual welts or rands from a single elongated blank, that the total combined length of the individual strips so separated from the original welt, will exceed the total length of said original strip, as well as providing for the novel features or adaptation for use and convenience in application to various positions in the shoe described, and also producing a multiple number of welts of the desired length without wasting any material; also by means of this improved method of cutting, practically the original amount of material is retained in the finished welt, at the place where it is sewed to the upper and insole, where the groove is located.

The invention includes the method of construction of a multiple number of similar, or duplicate individual welts, the body portion of each one having parallel longitudinal edges, and having its extremities reduced gradually in the same, or in opposite directions.

These narrowed or reduced extremities of the welts are positioned preferably in the shank of the shoe, because in this portion of the shoe, the welt or sole rand is subjected to a less amount of wear and strain than in other portions, and in the heel rand, the reduced portions are applied to the portion of the heel adjacent to the breast.

The original flexible strips have heretofore been constructed by cutting them in long continuous pieces and after applying them to the insole and upper at the inseam, the welts have been cut off at a point back of the breast of the heel and have been afterward butted or trimmed away at a point more nearly adjacent to the breast of the heel, also heretofore, in a stitched down shoe where the strip has been placed above the upper, and extended completely around the shoe, the original strip has been first fastened in place and then cut at the meeting points of the extremities.

In the present method in making a stitched down shoe, the blank is first cut at a predetermined length and afterward is stitched into place above the upper, with the reduced extremities meeting at the back of the shoe above the heel, or at any other convenient point, and passing along both sides of the shoe above the upper and above both edges of the shank and around the fore part of the shoe above the upper. The individual welts employed for other positions are also previously cut and then applied in place.

The invention includes cutting the original blank into a plurality of individual strips having overlapping extremities, the directions of the overlap being in the same, or opposite, directions at their opposite extremities, and the importance of this feature lies in the amount of saving of material obtained in this manner, which equals the amount of the overlap in every case.

As a further illustration of the economy of material obtained by means of this method of construction, it would be well to state that ordinarily long strips of welting material are formed by cementing a number of blanks together, with this disadvantage, that when a cemented joint comes at the curve of the toe of the shoe it is likely either to open up under the bending strain, when sewed by the machine, or to be so stiff that it can not be readily bent to fit the curve of the toe; and to avoid these difficulties, when the joint in the cemented welt or rand is found to come at the toe of the shoe, enough welting material must be drawn out of the machine to permit the cemented joint to be drawn back to the side of the shoe, the surplus material being wasted, whereas, in the improved method, if a cemented joint is found to occur at the curve of the toe, the welt or rand can be recut so that two welts can be formed and the cemented joint will not come at the curve of the toe, neither will any waste be formed.

The several steps of the above process are illustrated in the accompanying drawings, hereinafter described and clearly pointed out in the claims.

In the accompanying drawings Figure 1 is a perspective view showing the preferred method of cutting the original welt or rand, showing a long strip of welting material cut across at spaced positions in the same general direction, and in a diagonal plane, and in such a manner as to produce overlapping extremities; Fig. 2 is a perspective showing one of the overlapping extremities enlarged; Fig. 3 is a plan of a modification showing the welt or rand cut upon a plane substantially parallel with the horizontal sides of the welt or rand; Fig. 4 is a perspective showing the appearance of the cut extremity; Fig. 4ª shows the other extremity; Fig. 5 is a perspective showing the welt cut on vertical planes substantially paralleled with the vertical edges. Fig. 6 is a perspective showing the appearance of the extremities of this form. Fig. 7 is a perspective of a portion of a welt, showing only one reduced extremity. Fig. 8 is a perspective of a welt forming one of the divisions of Fig. 1 enlarged, the thick edge being continuous from end to end. Fig. 9 is a transverse section of the body of a finished welt, showing the groove upon the flesh side and the bevel upon the upper inside corner thereof. Fig. 10 is a plan of a finished welt showing the groove on the body and extremities. Fig. 11 is a plan of a welt as applied to a stitched down shoe. Fig. 12 is a perspective of a heel rand. Fig. 13 is a perspective of a sole rand.

In these views A represents a long flexible welt which is first cut into predetermined lengths to form a multiple number of individual welts B, B. This welt is cut in any one of the several ways shown, each individual welt in this manner being provided with reduced extremities C, which overlap in the original welt, and when separated provide each individual portion with reduced extremities, except the end portion of the welt shown in Fig. 7, one end of which remains the same as before cutting.

In Fig. 1 these extremities are formed by cutting the original welt on diagonal longitudinal median planes C', C' from the inner lower corner to the upper outer corner, at one end, and at the other end cutting upon similar planes commencing upon the opposite side of the welt.

The lines of entering and emerging at $C^2$, $C^3$ are also obliquely inclined to the longitudinal axis of the welt so that the reduction in thickness is made as gradual as possible. The transverse section of one of the extremities produced, shown in Fig. 9ª is triangular.

In the preferred method of cutting the welt, the thick edge runs the entire length as shown enlarged in Fig. 8.

In Figs. 3 and 4, the plane of cutting is substantially parallel with the sides of the welt at G, and the cut enters the welt and emerges therefrom upon substantially obliquely inclined planes at G', $G^2$.

In Figs. 5 and 6, the plane of cutting is substantially parallel with the vertical edges of the welt at H and the cut enters and emerges from the edges in substantially obliquely inclined planes at H' and $H^2$.

After the original welt has been cut into a number of individual welts, they are separated so that the under sides of the welts and freshly cut surfaces of the extremities can be grooved and the groove E is then formed adjacent to the thickest edge from end to end on the bottom or flesh side of each welt.

This differs from former processes, since heretofore the entire original welt is grooved and beveled in a continuous manner, which could not be done in constructing these welts, on account of their overlapping extremities. This groove must be positioned adjacent to the thick edge of the extremities to their extreme ends, and hence this groove must be positioned alternately adjacent to the opposite edges of adjacent welts as they occur in the original welt. For this reason the original strip cannot be grooved as it stands, but the component parts of the original strip must be separately grooved after they are detached from the original welt and a bevel F is simultaneously cut upon the upper corner of the inner edge thus completing the welt.

In Fig. 2, the welt is shown grooved on the original flesh side of the body portion, and it is grooved also on the newly exposed surface produced by the splitting operation on the portion which is reduced in section, and which adjoins the body portion.

In Fig. 4, the welt is grooved on the original flesh side of the body portion, and on the portion which is reduced in section, and which joins the said body portion.

In Fig. 4ª, the welt is shown grooved on the original flesh side of the body portion but is grooved on the newly exposed surface produced by the splitting operation on the portion which is reduced in section, and which adjoins the body portion.

In Fig. 6, the welt is grooved on the original flesh side of the body portion, and on the portion which is reduced in section, and adjoins the body portion.

In Fig. 7, the welt is grooved on the original flesh side on the body portion, but is grooved on the newly exposed surface produced by the splitting operation on the portion which is reduced in section, and which adjoins the body portion.

In Figs. 8 and 10, the welt is grooved on the body portion, and on one portion that is reduced in section and adjoins the body portion on the original flesh side, but on the other portion that is reduced in cross section and joins the body portion, the groove is shown on the newly exposed surface produced by the splitting operation.

In Fig. 13 the original strip is shown triangular in cross section to be used as a rand; In Fig. 12, a heel rand is shown; Fig. 10 shows a grooved and beveled welt with reduced extremities; Fig. 11 shows a welt with reduced extremities as employed in a stitched down shoe.

Having described the invention, what I claim as new and desire to secure by Letters Patent is:—

1. The hereinbefore described method of producing a multiple number of welts each welt having reduced extremities, from an elongated integral welt having straight sides and edges, consisting in, dividing said welt at intervals by cuts in median planes, longitudinally directed therein, the extremities of said cuts emerging in opposite longitudinal surfaces of said welt, then separating the welts thus formed and forming a longitudinal groove upon the freshly cut surfaces of the extremities of each welt, said grooves traversing the original surfaces of the bodies of said welts.

2. The hereinbefore described method of producing a number of welts having longitudinally reduced extremities consisting in, dividing an elongated welt at intervals by cuts in median longitudinal planes; said median cuts emerging obliquely into opposite surfaces of said welt and then forming a longitudinal groove in each welt, said groove adjacent to the inner edge and traversing the original body surface and the freshly cut surfaces of the extremities of each welt.

3. The hereinbefore described method of producing a number of welts from a single elongated welt having straight sides and flat faces, consisting in, dividing the body of said welt by cuts in a median plane, obliquely inclined to the flat faces thereof, said cuts emerging obliquely upon opposite faces of said welt.

4. The hereinbefore described method of producing a number of welts from a single elongated welt, having straight sides and flat faces, consisting in first, dividing the body of said welt by cuts on median diagonal panes, the said cuts emerging into opposite flat faces of said body, thus producing reduced overlapping portions, and next, forming a groove upon the body portion of the welt and upon the freshly cut surfaces thus produced upon the overlapping portions.

5. The hereinbefore described process of producing a welt from an elongated blank, having straight sides and parallel edges, said welt having reduced extremities, the inner longitudinal edge of said welt and its extermities retaining the original thickness of the blank from which it is cut, for substantially the entire length of said welt and its extremities, consisting in, cutting said blank at spaced intervals upon median longitudinal planes the extremities of said cuts merging into opposite surfaces of said welt.

6. The hereinbefore described process of producing a welt having reduced extremities, said extremities retaining substantially the original thickness of the blank from which it is cut throughout substantially the entire length of said welt and its extremities, consisting in, cutting said extremities upon median longitudinal planes, the extremities of said cuts merging into opposite surfaces of said welt, then forming a longitudinal stitch receiving groove adjacent to the inner edge and on the lower face, for substantially the entire length of said welt and its extremities, said groove traversing the original body of said welt and the freshly cut surfaces of both extremities.

7. The hereinbefore described method of producing from an elongated flexible strip a multiple number of welts for use in a boot or shoe, each having an elongated body portion and two reduced extremities, said extremities adapted to cover the entire shank portion of the shoe, consisting in, dividing said strip at predetermined intervals by cuts in planes which enter one surface of said strip and emerge at the opposite surface, the lines of entrance and emergence of said cuts being spaced longitudinally of said strip, the plane of each cut being made on a line connecting the upper and lower corners on opposite edges of said strip, next producing a stitch receiving groove adjacent to the inner edge upon the lower face and along the body portion of said welt and continuing said groove along both extremities in the newly exposed surfaces produced by the above described line of cutting.

8. The hereinbefore described method of manufacturing a multiple number of individual welts, for use in a boot or shoe, consisting in, so cutting an elongated strip at predetermined intervals that overlapping portions are produced, and new surfaces exposed at the places severed, next forming a stitch receiving groove on the body portion adjacent to the inner edge, upon the bottom face of each severed welt, said groove also formed on the newly exposed surfaces of the overlapping portions which form the extremities, said groove on said extremities being a continuation of the groove upon the body portion of said welt.

9. The hereinbefore described method of manufacturing a multiple number of individual welts from an integral elongated strip of welting material consisting in, so cutting the said integral strip at predetermined intervals that overlapping extremities are produced at the points of cutting, each welt so produced provided with an integral overlapping portion, each overlapping portion adapted to extend over the shank portion of a shoe, next producing a stitch receiving groove along its body portion, adjacent to the inner edge upon the lower face of said welt and continuing said groove upon said extremity upon its lower face adjacent to its inner edge.

10. The hereinbefore described method of manufacturing a multiple number of welts from an integral elongated strip of welt material, consisting in, so cutting said integral elongated strip at predetermined intervals as to provide the severed portions with two overlapping extremities on each welt and parallel sides and edges, said reduced extremities having alternate flesh and grain sides, and adapted to extend over substantially the entire length of the shank portion of the shoe on both sides, next separating said overlapping extremities, and finally grooving each of said welts on the lower face adjacent to the inner edge along substantially its entire length and beveling the upper corner of the inner edge along substantially its entire length.

11. The hereinbefore described method of producing a number of welts from a single elongated welt, having straight sides and flat faces, consisting in first dividing the body of said welt by cuts on median diagonal planes, the said cuts emerging obliquely upon opposite faces of said welt, thus forming overlapping portions, each portion having one edge in which the original thickness is retained, and then separating the several welts thus obtained, and finally forming a stitch receiving groove on one face of each welt body and extremities, said groove traversing the body of the welt upon its original surface and the extremities of the welt upon their freshly cut surfaces, and positioned in that part of each extremity which retains substantially its original thickness.

12. The hereinbefore described method of manufacturing a multiple number of individual welts from an integral strip, consisting in, so cutting the integral strip that overhanging extremities with newly exposed surfaces are produced at the places severed next producing upon the newly exposed surface at one extremity of each welt a stitch-receiving groove upon the lower face thereof adjacent to the inner edge of said welt and continuing said groove along the face of the body portion thereof.

13. The hereinbefore described method of manufacturing a multiple number of individual welts from an integral strip, consisting in so cutting the integral strip that overhanging extremities with newly exposed surfaces are produced at the places severed, producing upon the one overhanging extremity of said welt and upon the original lower face a stitch-receiving groove adjacent to the inner edge thereof, and continuing said stitch-receiving groove along the lower face of the body portion and producing upon the other overhanging extremity and upon the freshly cut face thereof a stitch-receiving groove adjacent to the inner edge thereof.

14. The hereinbefore described method of manufacturing a multiple number of individual welts from an integral strip, consisting in so cutting the strip that an overhanging extremity with newly exposed face is produced at the place severed on each welt, said overhanging extremity forming a reduced shank portion upon said welt.

15. The hereinbefore described method of manufacturing a multiple number of individual welts from an integral strip, consisting in, so cutting the integral strip that overhanging extremities with newly exposed faces are produced at the places severed, next producing upon the newly exposed face at one extremity of each welt a stitch-receiving groove, adjacent to the inner edge of said welt, and continuing said groove along the lower face of the body portion thereof, and producing a bevel upon the upper inner corner of each welt.

16. The hereinbefore described method of manufacturing a multiple number of individual welts from an integral strip, consisting in, so cutting the integral strip that overhanging extremities with newly exposed faces are produced at the places severed, producing upon the one overhanging extremity of said welt and upon the original lower face a stitch-receiving groove adjacent to the inner edge thereof, and continuing said stitch-receiving groove along the lower face of the body portion and producing upon the other overhanging extremity and upon the freshly cut face thereof a stitch-receiving groove adjacent to the inner edge thereof and continuing said stitch-receiving groove along the lower face of the body portion thereof, and producing a bevel upon the upper inner corner of each welt.

In testimony whereof, I hereunto set my hand this 18th day of July, 1919.

ERNEST A. YOUNG.

In presence of—
   Wm. M. Monroe,
   Chas. F. Sipe.